// United States Patent [15] 3,644,937
Isett [45] Feb. 22, 1972

[54] CHANNEL-STACKING INPUT/OUTPUT INTERCONNECTIONS

[72] Inventor: Donald D. Isett, Dallas, Tex.

[73] Assignee: Texas Instruments Incorporated, Dallas, Tex.

[22] Filed: July 15, 1969

[21] Appl. No.: 841,859

[52] U.S. Cl. .....444/1
[51] Int. Cl. .....G06f 15/20
[58] Field of Search .....340/172.5; 235/157; 29/577; 317/101

[56] References Cited

UNITED STATES PATENTS

| | | | |
|---|---|---|---|
| 3,391,392 | 7/1968 | Doyle | 340/172.5 |
| 3,473,157 | 10/1969 | Little et al. | 340/172.5 |

OTHER PUBLICATIONS

Breuer, General Survey of Design Automation in Digital Computers, Proceedings IEEE, Vol. 54, No. 12, Dec. 1966, pp. 1708–21.
Hyman, Computer Aided Design...of Printed Circuit Boards, Advances in Electrical Packaging, Vol. 8, Aug. 1967, pp. 1–7.
Kallas, Computer Aided Wiring Design, Bell Labs. Record, Nov. 1964, pp. 343–49
Lee, An Algorithm for Path Connection and its Applications, IEEE Trans. On Elec. Computers, Sept. 1961, pp. 346–365.
Heath, F. G.; Scientific American; pages 30–31; Large-Scale Integration in Electronics; Vol. 222, No. 2; Feb. 1970.

*Primary Examiner*—Paul J. Henon
*Assistant Examiner*—Sydney R. Chirlin
*Attorney*—James O. Dixon, Andrew M. Hassell, Harold Levine, Melvin Sharp, John E. Vandigriff, Henry T. Olsen and Michael A. Sileo, Jr.

[57] ABSTRACT

Active components, such as logic gates or flip-flops formed in a semiconductor substrate are interconnected to input/output bonding pads and other active components in a circuit array in four separate operations. First, after arranging the active components in rows, signal points of all components in one row are interconnected by considering the longest interconnection and proceeding to the shortest. Next, component signal points between rows are interconnected again by considering the longest interconnecting path and proceeding to the shortest path. Third, input/output component signal points are assigned to input/output conductive pads. Finally, interconnecting paths are completed between the input/output component signal points and an assigned pad in a numbered order. Each operation uses a distinct algorithm to complete the necessary steps.

13 Claims, 9 Drawing Figures

INVENTOR:
DONALD D. ISETT

INVENTOR:
DONALD D. ISETT

INVENTOR:
DONALD D. ISETT

CHANNEL-STACKING INPUT/OUTPUT INTERCONNECTIONS

This invention relates to copending patent applications, Ser. Nos. 841,858 and 841,867, filed of even date and assigned to the assignee of the present patent application.

This invention further relates to integrated circuitry, and more particularly, to an integrated circuit and interconnecting paths between components and between input/output signal points and bonding pads.

Heretofore, many of the techniques used for establishing the interconnections for active components in a semiconductor substrate in a circuit array and the interconnecting paths between components and input/output bonding pads have resulted in inefficient use of the substrate area. Considerable space was left vacant because of the order in which the many interconnecting paths were established. Basically, previous routing techniques considered the shortest interconnections first and the longest last. The same inefficient use of space also resulted when establishing paths between input/output signal points and input/output bonding pads.

An object of the present invention is to provide an integrated circuit having a component interconnection pattern that minimizes unused substrate area. Another object of this invention is to provide a method of circuit layout for reducing the substrate area required in producing a given integrated circuit. A further object of this invention is to provide a method for improving the yield of acceptable units in the fabrication of integrated circuitry by the use of accurate artwork that reduces substrate area to a minimum. A still further object of this invention is a method of designing a set of circuit masks including channel-stacking interconnecting paths between signal points and input/output pads.

In accordance with this invention, after all the active components for a selected system have been located in parallel rows, the active components in a given row in the circuit array are interconnected by a routing technique that attempts to minimize the number of channels required for placing the conductor paths. The interconnecting paths are considered in an order of descending length. A series of passes may be required to complete the interconnection of signal points arranged in a given row. Each pass assigns interconnecting paths to the next highest numbered channel from the preceding pass, starting from the first channel adjacent the component row. Each pass also starts by considering the longest remaining interconnection to be made and proceeds to the shortest. The total number of passes required for completing the intrarow connections is that necessary to completely interconnect the signal points on a row basis. Next, a routine is run to interconnect signal points between components arranged on different rows in the circuit array. The basic algorithm for establishing the interconnecting paths between signal points on different rows is to proceed from the longest interconnection to the shortest, it having been previously established that the path does not interfere with the interconnection to another signal point. Again, a number of passes are made with each subsequent pass establishing interconnecting paths in the next highest numbered channel from the preceding pass.

After all signal points in and between rows in an array have been interconnected, the input/output signal points are assigned to bonding pads. Assignment of component input/output signal points to the input/output bonding pads proceeds using the algorithm of the angular difference between the polar angle, relative to a polar coordinate center, established by the azimuth of the input/output point and a reference axis and a polar angle, relative to the same center, established by the azimuth of an input/output pad and the reference axis. Again a sequence of passes will be required. In the first pass all input/output signal points are assigned to individual bonding pads if the angular difference is less than a first threshold angle. For each subsequent pass, the threshold angle is increased. This continues until all the input/output signal points have been assigned an input/output pad. After completing the assignment of pads to signal points, a channel-stacking routing technique interconnects the signal points to the assigned pad.

This channel-stacking routing routine consists of a number of passes wherein the lowest numbered signal point, not previously considered in a pass, is interconnected with its assigned conductive pad, using the lowest numbered channel external to the array, on a space-available basis, if the interconnecting path provides space for establishing an interconnection to any other signal point and its assigned pad. Each pass begins with the lowest numbered unassigned point and continues establishing interconnecting paths in a particular numbered channel. This continues until all input/output signal points have been interconnected with the assigned bonding pad.

After the various routines have been run to assign the input/output signal points to bonding pads, and to interconnect signal points in rows and between rows, pattern masks are generated for the fabrication of an integrated circuit. In a metal-oxide-semiconductor (MOS) configuration, the source and drain of the active components and parts of the interconnecting paths are formed by diffusion into a semiconductor substrate covered by a silicon dioxide insulating layer. A circuit of this type may be formed with as few as four mask patterns. One mask outlines the active component areas and the interconnecting paths formed by diffusions in the semiconductor substrate. A second mask defines the thin oxide regions beneath the gate metal. A third mask defines feedthrough areas through the insulating layer to interconnect the metal parts to the diffused parts. A fourth mask outlines the metal interconnecting paths overlaying the oxide insulating layer and the gates of the MOS devices.

A more complete understanding of the invention and its advantages will be apparent from the specification and claims and from the accompanying drawings illustrative of the invention.

Referring to the drawings.

Figure 8A:
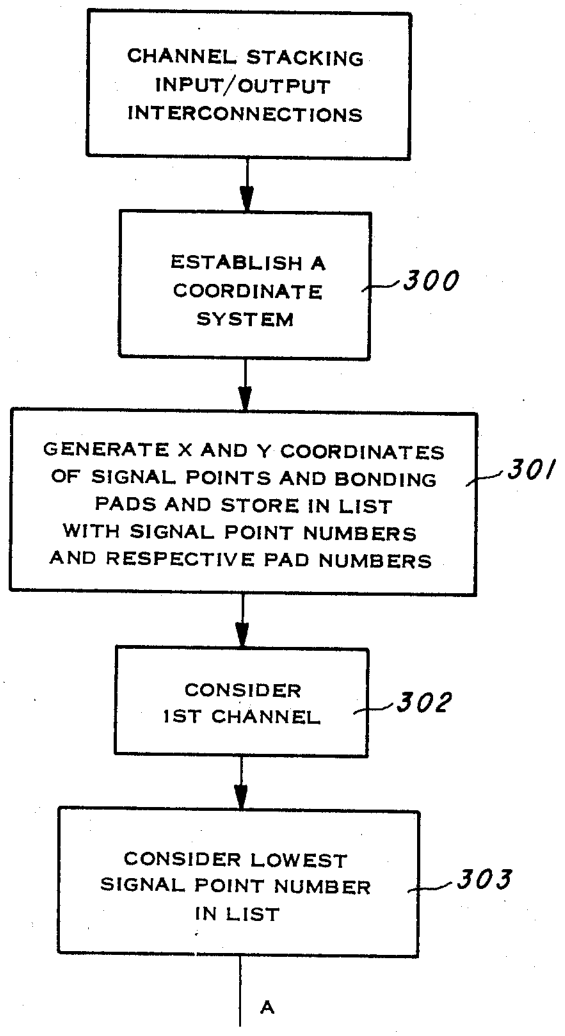
Figure 8B:
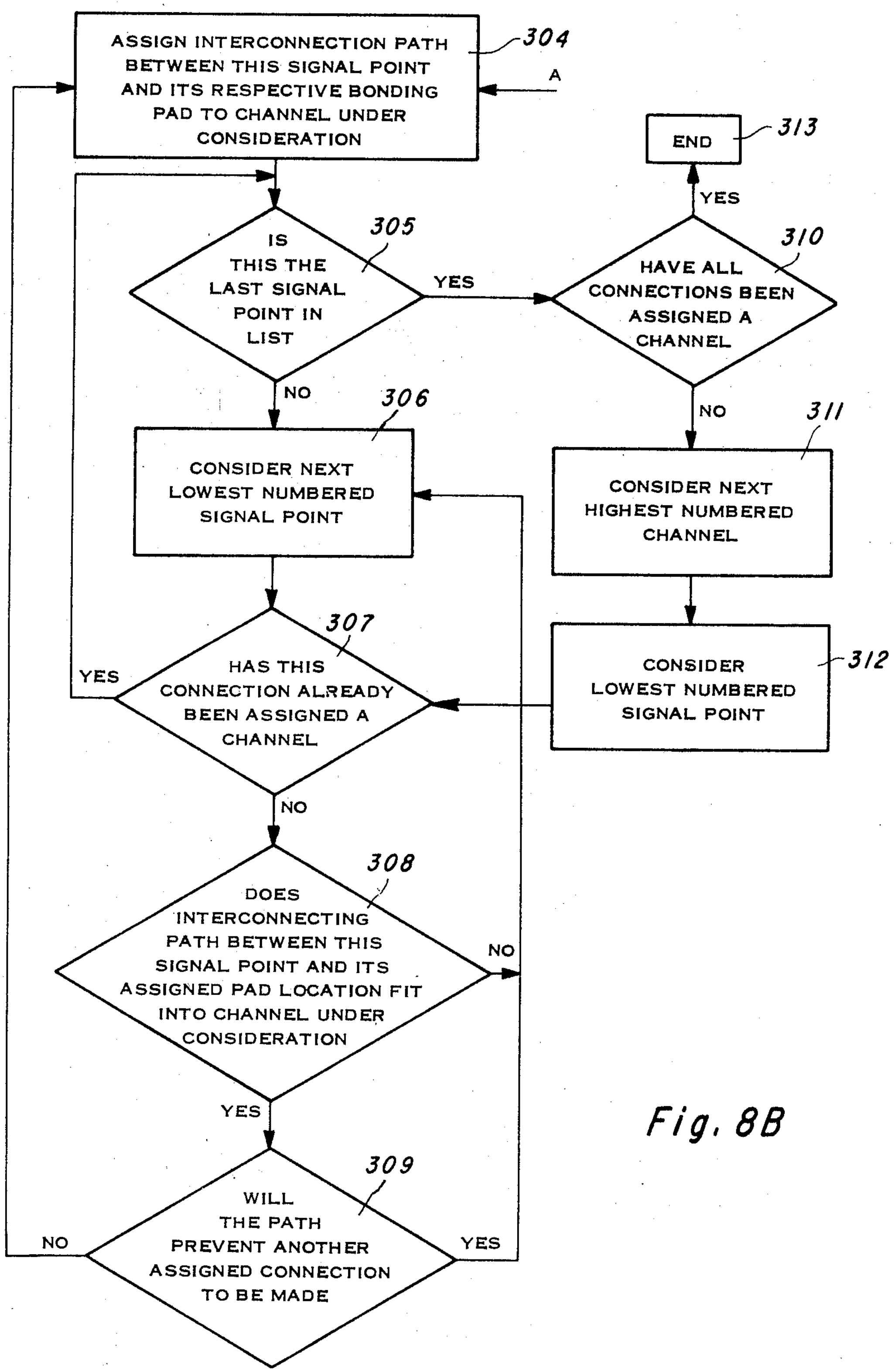

FIGS. 8*a* and 8*b* are flow charts showing the method of channel stacking input/output interconnections in accordance with an embodiment of the invention.

Figure 1:
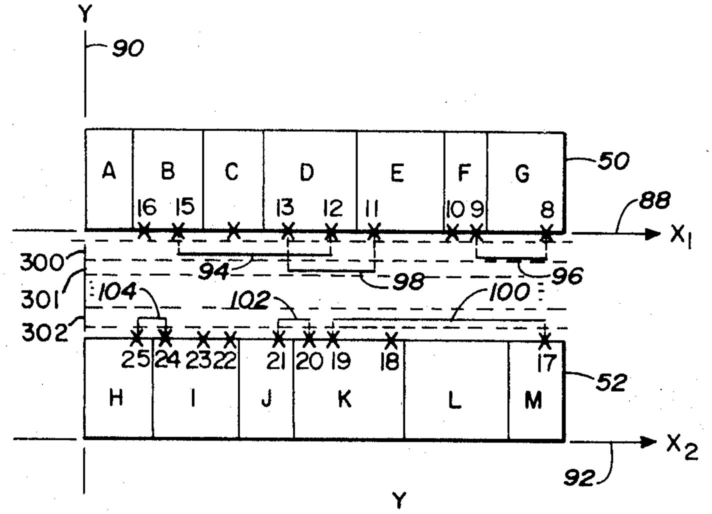
FIG. 1 illustrates the routine for generating representations of interconnecting paths between points of active components in the same row.

Referring to FIG. 1, after all the active circuit components A through M have been located in a series of rows by a routine that considers the length of interconnecting leads, a subroutine for interconnecting signal points of components located in a given row is considered. Initially, coordinate systems are established to locate the signal points to be interconnected. Signal points on row 50 are located with respect to an $x_1$-axis 88 and a $y$-axis 90. Signal points on row 52 are located with respect to an $x_2$-axis 92 and the $y$-axis 90. After all the signal points on the row 50 have been located with respect to the coordinate axis system, a list is made of the interconnections starting with the longest interconnection and proceeding to the shortest interconnection. Similarly, a list of interconnections for the signal points on row 52 will be made, again starting with the longest and proceeding to the shortest. Each interconnection in both rows will include the $x$ and $y$ coordinates for the end points, which establishes the length of the interconnection. For row 50, the information required by an automatic data processor is given in Table I. For the components on row 52, the same information is given in Table II.

TABLE I

| Interconnection | y | $x_1$ |
|---|---|---|
| 12–15 | $y_{12}$ | $x_{12}$ |
| | $y_{15}$ | $x_{15}$ |
| 11–13 | $y_{11}$ | $x_{11}$ |
| | $y_{13}$ | $x_{13}$ |
| 8–9 | $y_8$ | $x_8$ |
| | $y_9$ | $x_9$ |

TABLE II

| Interconnection | y | $x_2$ |
|---|---|---|
| 17–19 | $y_{17}$ | $x_{17}$ |
| | $y_{19}$ | $x_{19}$ |
| 20–21 | $y_{20}$ | $x_{20}$ |
| | $y_{21}$ | $x_{21}$ |
| 24–25 | $y_{24}$ | $x_{24}$ |
| | $y_{25}$ | $x_{25}$ |

First, representations of interconnecting paths for signal points located in row 50 will be generated and stored. Referring to Table I, the longest interconnecting path will be considered first. The longest path listed is the interconnection between signal point 12 and signal point 15. This will be located in the first available stacking channel 300. After generating and storing the representation of the interconnecting path between the signal points 12 and 15, the routine considers the next longest interconnecting path. The next path to be considered will be that interconnecting signal point 11 to signal point 13. This interconnection, however, cannot be made in the first signal channel 300, the channel under consideration, due to the previously established interconnecting path 94 between points 12 and 15. Thus, the path between signal points 11 and 13 will be disregarded in the first pass. The routine will then consider the interconnection between the signal points 8 and 9. Although this is the shortest signal path given in the Table I, it is the only one remaining in the Table that can be fit into the channel 300 under consideration. A representation of an interconnecting path 96 between signal points 8 and 9 will thus be generated and stored.

After all the interconnections in row 50 have been considered on the first pass and either assigned an interconnecting path or disregarded, a second pass will be made where the next highest numbered channel 301 will be considered. In the simple example of FIG. 1, only the interconnection between signal points 11 and 13 remains to be connected. This will be placed in the next highest numbered channel 301 from the path 94. Thus, in the second pass a representation of the interconnecting path 98 between signal points 11 and 13 will be generated and stored.

If additional interconnections on row 50 remained in Table I, additional passes may be required. In each pass, the longest remaining interconnecting path is considered first and proceeds to the shortest path remaining. Those interconnections not fitting into the channel under consideration will be disregarded for a particular pass. By considering the longest connections first, fewer stacking channels will be required to complete all connections in a given row.

Next, the component signal points in row 52 will be interconnected. Referring to the Table II, it will be noted that the longest interconnecting path is between signal points 17 and 19. In the first pass for interconnecting components in the row 52, a representation of the interconnection path 100 in channel 302 will be generated and stored. In the same pass, an interconnecting path 102 can be established between signal points 20 and 21. Finally, the path 104 interconnecting points 24 and 25 will be established in the first pass. Note, that although the routine considers the longest unassigned interconnection first, it also considers placing interconnecting paths on a space-available basis in the channel under consideration. Again, in row 52 as in row 50, the interconnections are considered in subsequent passes, if needed, starting with the longest unassigned path and proceeding to the shortest.

Figure 2:
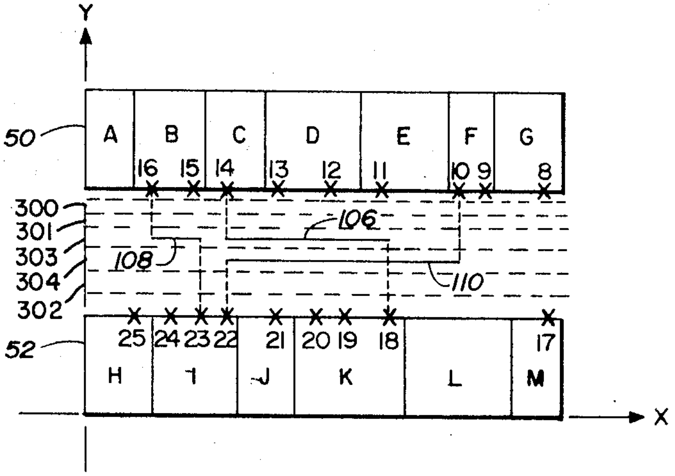
FIG. 2 illustrates the routine for generating representations of interconnecting paths between signal points of active components located on different rows.

The next routine for generating and storing representations of interconnecting paths establishes interconnections between signal points located on different rows. Referring to FIG. 2, component signal points on row 50 are interconnected to component signal points on row 52. Initially, an *x* and *y* coordinate axis system is established and a list made of the coordinates of each of the various signal points. Further, a list is constructed of three categories of interconnecting paths giving the signal points for each interconnecting path starting with the longest interconnection and proceeding to the shortest for each of the three categories.

The first category of the numbered list includes all interconnections that can be made in channels associated with the row 50. For the second category, the interconnections between rows will be listed where the paths are placed in a channel associated with the row 52. In the last category, all interconnections which cannot be definitely placed in the channels either associated with row 50 or 52 will be listed. All three categories list interconnections starting from the longest and proceeding to the shortest.

To determine whether a given connection is a category-one, category-two or category-three type, the subroutine considers whether an interconnecting path between two points can be made in channels associated with row 50 without blocking off any other signal point. Consider the interconnection 110 between the signal points 10 and 22; if this path is established in the next available channel after completion of the intrarow routine, the signal point 14 will be blocked and the interconnection between signal points 14 and 18 cannot be made. Thus, the interconnection 110 is not a category-one connection. Category-one interconnections of FIG. 2 include the path between points 14 and 18 and the path between points 16 and 23.

After all category-one interconnections have been listed, the routine next considers category-two interconnections. The same test is applied, that is, whether an interconnecting path placed in a channel associated with row 52 will interfere with establishing an interconnection to any other signal point. Again considering interconnection 110, this will be a category-two interconnection and the path will be located in a channel associated with row 52. Category-three interconnections will be a listing of those which cannot be placed in either category one or category two because it is uncertain whether or not they would interfere with a connection to any other point. In the example of FIG. 2, no category-three interconnections exist.

After establishing the three categories of interconnections, the routine next generates representations of the interconnections listed in category one. These interconnections will be considered starting from the longest and proceeding to the shortest. The first channel to be considered will be channel 303 of row 50, that is, the first unused channel after establishing interconnections between signal points located on the same row. First, the interconnection between the signal points 14 and 18 will be considered to determine if it can be established in the conductor channel 303. Since this is the longest category-one interconnection, it will be established in channel 303. The next interconnection to be considered is that between signal points 16 and 23. The controlling factor for determining the next interconnection to be considered is on the basis of length. The interconnection between signal points 16 and 23 will also be established in the third conductor channel 303, and a representation of a path 108 will be generated and stored for future pattern fabrication.

After considering all the interconnections in the first category in the first pass on a space-available basis, a second pass will be made for category-one interconnections to establish connections in the fourth conductor channel 304. In the example given, all category-one interconnections are completed in the third conductor channel 303. The number of passes needed for category one will depend on the number of interconnections required.

Upon completion of all category-one interconnections, the routine next considers category two interconnections. Again, they will be considered on a length basis from the longest and continuing to the shortest. In the example given, only the interconnection between signal point 10 and 22 is listed in category two. A representation of an interconnecting path 110 will be generated and stored in the first available conductor channel 304 from the row 52. For category-two interconnections, additional passes will be made, if needed, to place additional interconnections in higher number conducting channels until all interconnections have been completed.

Finally, interconnections in category three will be considered. After placing the connections for category one and category two, many of the interference problems that determined a given connection to be in category three will have been eliminated. Category-three interconnections are then placed starting with the lowest numbered channels until all interconnections have been made.

As an alternative, another subroutine may be employed for generating and storing representations of interconnecting paths between signal points located on different rows. Again referring to FIG. 2, component signal points on row 50 are interconnected to component signal points on row 52. Initially, an $x$ and $y$ coordinate axis system is established and a list made of the coordinates of each of the various signal points. Further, a number list is constructed giving the signal points for each interconnecting path starting from the longest interconnection and proceeding to the shortest.

In all the interconnecting path routines, the same conductor channels are employed. Again, the highest numbered unused channel is considered in the first pass for interconnecting signal points located in different component rows. For the three interconnections illustrated in FIG. 2, Table III lists the connections in order of length giving the $x$ and $y$ coordinates of the signal points at either end of a connecting path.

TABLE III

| Interconnection From Row 50 | | To Row 52 | |
|---|---|---|---|
| Point | $(x,y)$ | Point | $(x,y)$ |
| 10 | $(x_{10},y_{10})$ | 22 | $(x_{22}, y_{22})$ |
| 14 | $(x_{14},y_{14})$ | 18 | $(x_{18}, y_{18})$ |
| 16 | $(x_{16}, y_{16})$ | 23 | $(x_{23},y_{23})$ |

The longest interconnecting path is that between signal point 10 and signal point 22. The first channel to be considered will be channel 303, that is, the first unused channel after establishing interconnections between signal points located on the same row. A path between the signal point 10 and the signal point 22 will be established in channel 303 if the interconnecting path provides space for establishing interconnections to all intervening signal points. Thus, the subroutine checks all the unassigned signal points in row 50 and all the unassigned signal points in row 52 to determine if an interconnecting path in channel 303 between signal points 10 and 22 will prevent connection thereto. In making this check, for the path between points 10 and 22, it will be determined that establishing a path in channel 3 will prevent an interconnection to signal point 14. Under these circumstances, the interconnection between signal points 10 and 22 will be disregarded in the first pass. Next, the interconnection between the signal point 14 and 18 will be considered to determine if it can be established in the conductor channel 303. Again, an investigation will be made to determine if a path in channel 303 will prevent a connection to an intervening signal point. In this case, a representation of the conducting path 106 will be established.

Continuing with the list of Table III, the next interconnection to be considered is that between signal points 16 and 23. This will be established in the third conductor channel 303, and a representation of a path 108 will be generated and stored for future pattern fabrication.

After considering all the interconnections in the first pass on a space-available basis, a second pass will be made to consider establishing the unassigned interconnections in the fourth conductor channel. In the simple example given, only the interconnection between signal points 10 and 22 remains. Thus, an interconnecting path 110 will be generated and stored in the second pass. The number of passes needed will depend on the number of interconnections required. Each pass will consider a next highest numbered conductor channel and consider all unassigned paths starting from the longest and proceeding to the shortest.

Figure 3:
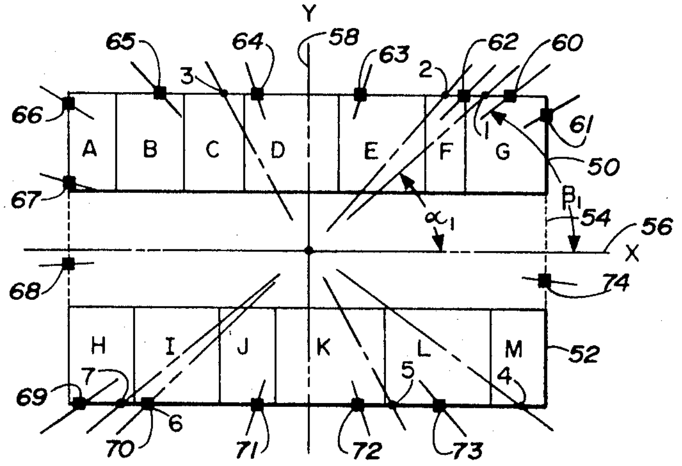
FIG. 3 illustrates the routine for assigning input/output component signal points to input/output component pads.

Referring to FIG. 3, the array of active component elements, such as logic gates or flip-flops, are arranged in rows 50 and 52. In each of the rows 50 and 52, the active components are represented by various size rectangular blocks. Of the blocks A through G in row 50, blocks C, F and G have input/output component signal points to be interconnected to bonding pads outside the array illustrated. Similarly, of blocks H through M of row 52, blocks H, I and L have input/output component signal points to be interconnected to bonding pads outside the array illustrated.

To be interconnected to circuitry other than that illustrated, the various input/output component signal points must be tied to input/output bonding pads arranged around the periphery 54 of the circuit array. It should be understood that FIG. 3 represents a hypothetical case and in actual practice the input/output bonding pads may all be arranged along the top and bottom of the array. For purposes of explaining the invention, however, the conductive pads are shown randomly spaced around the periphery. Also, they are illustrated as located along the component edge. This is a temporary location for purposes of completing the assignment routine.

To form an interconnecting path between a given input/output component signal point and a bonding pad, the first step is to assign each signal point to an individual pad. This is accomplished by first preparing a polar coordinate system including an $x$-axis 56 and a $y$-axis 58. Next, each of the input/output component signal points 1–7 are position-located by a polar angle established by a line extending through the polar coordinate center and the signal point and a reference axis. For example, signal point 1 is located by an angle $\alpha_1$. In addition to the signal points, the input/output bonding pads 60–74 are also located by a polar angle, again relative to the same center and reference axis as the signal points. Note, that the pads 60 through 74 are temporary locations for purposes of completing the routine and are not intended to represent an actual pad.

After each of the signal points 1–7 and the pad locations 60–74 have been located by a polar angle, an assignment of a particular pad can be made to an individual signal point. This assignment is made by first considering the signal point 1 and comparing its polar angle with the polar angle of all the pad locations. If the minimum difference between the polar angle for the signal point 1 and the polar angle of any of the pad locations is less than a threshold value, then the signal point 1 will be assigned that pad location. For example, if the signal point 1 has a polar angle $\alpha_1$ and the pad location 60 has a polar angle $\beta_1$, then if the difference between these two angles is less than between the signal point and any other available pad and is less than a threshold angle, the pad location 60 will be assigned to the signal point 1. Assume, however, that the difference between the polar angle for the pad location 60 and the signal point 1 is greater than the threshold value. In this case, the signal point 1 will be passed and not assigned a pad location.

The assignment routine next considers signal point 2 and compares the polar angle of the signal point 2 with all the polar angles of the still available pad locations. If the minimum difference between the angle of signal point 2 and any of the still available bonding pads is less than the first threshold level, then signal point 2 will be assigned that pad location. Assume that the absolute difference between the polar angle for the signal point 2 and the polar angle for the pad location 62 is less than the first threshold angle, $\Delta_1$, that is, $\alpha_2-\beta_{62}$ is less than $\Delta_1$, and is less than the difference between any other available signal point and the angle for pad location 62, then the pad location 62 will be assigned to the signal point 2. This routine continues until signal points 3 through 7 have been considered for the first threshold level.

Assume in the first pass signal points 2, 3, 5 and 6 were assigned conductive pad locations. Then, in the second pass, a new threshold angle will be established and signal points 1, 4 and 7 considered in the second pass. Again, the polar angle for the signal point 1 is compared with each of the polar angles for the unassigned input/output pad locations. If the polar angle $\alpha_1-\beta_{60}$ is less than the difference between the polar angle of any other still available signal point and the pad location 60 and is less than $\Delta_2$, then the location 60 will be assigned to the signal point 1. Signal point 4 is considered next with the polar angle $\alpha_4$ compared to the polar angles for the unassigned pad locations. If the minimum difference in the absolute magnitude between the polar angle for the signal point 4 and any of the unassigned pad locations is greater than $\Delta_2$, then the signal point 4 is passed in the second assignment pass. After considering point 4, the signal point 7 is considered. If the difference between the polar angle, relative to the polar coordinate center, established by the azimuth of the input/output signal point 7 and a reference axis and a polar angle, relative to the same center, established by the azimuth of an unassigned input/output pad location and the reference axis is less than the second threshold angle and less than the difference for any still available signal point and a bonding pad, then the signal point 7 will be assigned a pad location.

Assume that the pad location 69 is assigned to signal point 7 in the second pass; then only signal point 4 remains unassigned. A third threshold angle is established and the polar angle of point 4 again compared with the polar angles of the remaining unassigned pad locations. If the absolute value of the minimum difference between the polar angles of the signal point and still available bonding pads is less than $\alpha_3$, the third threshold angle, then the signal point 4 will be assigned to that pad location. Additional passes, however, may be required to assign a pad location to the signal point 4. With each pass, the threshold angle is increased. Eventually, all the signal points will be assigned to a pad location.

For the illustration of FIG. 3, Table IV lists the signal points and the assigned pad locations as determined by the above-described routine. In a data processing machine, representations associating each of the input/output signal points with the assigned pads would be generated and stored.

TABLE IV

| Signal Point | Pad Number |
|---|---|
| 1 | 60 |
| 2 | 62 |
| 3 | 64 |
| 4 | 73 |
| 5 | 72 |
| 6 | 70 |
| 7 | 69 |

Figure 4:
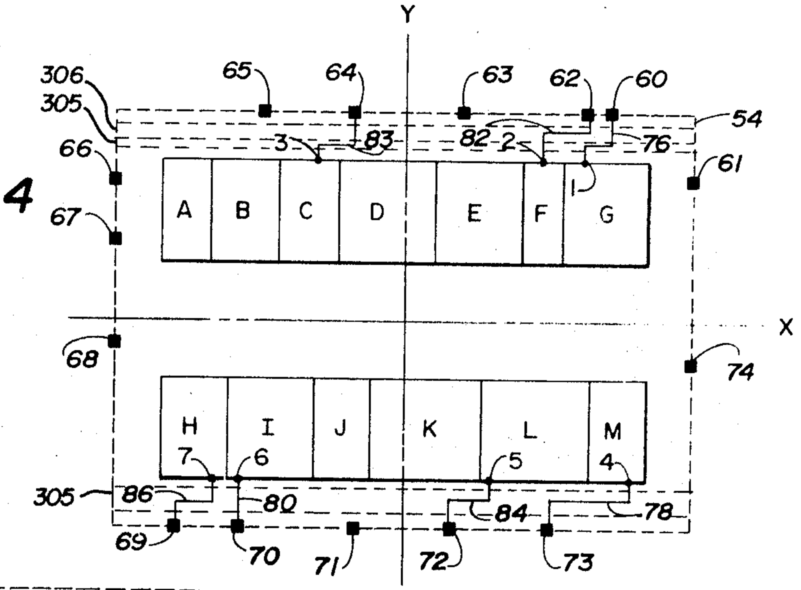
FIG. 4 illustrates the routine for interconnecting input/output component signal points to the individual assigned input/output component pads.

After assignment of all the input/output signal points to a bonding pad location, the next routine for generating a pattern to produce an integrated circuit is to generate and store representations of interconnecting paths between input/output component signal points and their assigned pad locations, illustrated in FIG. 4. Input information for this section of the routine illustrated in FIG. 8*a* and 8*b* is given in Table V by signal point number and conductive pad location.

TABLE V

| Signal Point | x | y | α | Pad Number | x | y | β |
|---|---|---|---|---|---|---|---|
| 1 | $x_1$ | $y_1$ | $\alpha_1$ | 60 | $x_{60}$ | $y_{60}$ | $\beta_{60}$ |
| 2 | $x_2$ | $y_2$ | $\alpha_2$ | 62 | $x_{62}$ | $y_{62}$ | $\beta_{62}$ |
| 3 | $x_3$ | $y_3$ | $\alpha_3$ | 64 | $x_{64}$ | $y_{64}$ | $\beta_{64}$ |
| 4 | $x_4$ | $y_4$ | $\alpha_4$ | 73 | $x_{73}$ | $y_{73}$ | $\beta_{73}$ |
| 5 | $x_5$ | $y_5$ | $\alpha_5$ | 72 | $x_{72}$ | $y_{72}$ | $\beta_{72}$ |
| 6 | $x_6$ | $y_6$ | $\alpha_6$ | 70 | $x_{70}$ | $y_{70}$ | $\beta_{70}$ |
| 7 | $x_7$ | $y_7$ | $\alpha_7$ | 69 | $x_{69}$ | $y_{69}$ | $\beta_{69}$ |

Starting again with the lowest numbered signal point, signal point 1, an attempt is made to establish an interconnecting path to the assigned pad location, that is, pad location 60. To establish any interconnecting path between a signal point and its assigned pad location, two criteria must be satisfied; one, does the interconnecting path fit into the connecting channel under consideration, and, two, will that particular interconnecting path prevent connection to any other input/output signal point. If the first question is answered in the affirmative, and the second question in the negative, an interconnecting path is established.

Consider the concept of channels in which interconnecting paths may be located. Starting from the outer edge of the component array at which the signal points are located, there is a series of equally spaced, parallel areas in which conducting paths may be located without interfering with adjacent conductors. In establishing interconnecting paths between input/output signal points and input/output bonding pads, the first channel 303 will be located closest to the component edge. Subsequent conductive channels will be displaced from the first channel.

Referring to the method of FIGS. 8*a* and 8*b* when read in conjunction with FIG. 4, to construct the input information as given in Table V, the components arranged on rows 50 and 52 are located in a coordinate axis 300 as described with reference to FIG. 3. Both the *x* and *y* coordinates of the signal points 1 through 7 and the temporary *x* and *y* coordinates of the respective assigned pad locations 60, 62, 64, 69, 70, 72 and 73 must then be generated 301 using the coordinate axis. The angle established by an azimuth through the various signal points and pad locations and the reference axis is carried over from the pad assignment routine.

With the information given in Table V, signal point 1 is considered first 303 along with the pad location 60. Since there are no other interconnecting paths in the first channel 302 and a path from the point 1 to the pad location 60 will not interfere with subsequent interconnections, a representation is generated and stored establishing 304 an interconnecting path 76 between the signal point 1 and the location 60. The end points and bend points of the path 76 are established by *x* and *y* coordinates taken from Table V and stored information for the various channels.

After establishing the interconnecting paths 76, the signal point 2 is considered 305–307 next along with the pad location 62. Since the first routing channel 305 is being considered and the first criteria 308 cannot be satisfied, an interconnecting path between the signal point 2 and the pad location 62 cannot be fit at this time due to the interconnecting path 76. Given this set of circumstances, the signal point 2 is skipped for the first pass and the routine proceeds to the signal point 3 at 306.

Since there are no previous interconnecting paths in channel 305 between the signal point 3 and the pad location 64, a representation of an interconnecting path will be generated and stored 304, again using $x$ and $y$ coordinates to locate the end points and bend points. Still considering the first routing channel 305, the signal point 4 is considered next 305–307. An interconnecting path will be established 304 in the first pass between the signal point 4 and the pad location 73, since no other paths are in the first channel 308 and the path 78 will not interfere 309 with connections to other signal points. Signal points 5 also will be connected 304 on the first pass 304–309 because an interconnecting path 84 can be established to the pad location 72 in the first channel. Next, the routine will consider 305–307 the signal point 6 to establish 308 and 309 an interconnecting path to the pad location 70. The representation of the interconnecting path 80 between the signal point 6 and the pad location 70 will be generated 304 and stored using the $x$ and $y$ coordinates to establish the end points and bend points. Still working on the first stacking channel 305, the signal point 7 can be interconnected to the pad 69. Signal point 7 is the last signal point in the list of TABLE V 305, but signal points (2 and 7) remain for which interconnection paths to their assigned pad locations have not been assigned 310 during the first pass.

On the second pass, the second stacking channel 306 will be considered 311 to determine if interconnections can be established between the remaining signal points that have not previously been interconnected to assigned pad locations. In the second pass, the signal point 2 will be considered first 312 and 307. An interconnecting path 82 will be established 308 and 309 to the pad location 62. A coded representation of the path 82 will be stored 304 for future fabrication of a pattern mask. Interconnection paths have now been established and assigned for all signal points in the list of TABLE V 310.

In an integrated circuit configuration formed in and on a semiconductor substrate, the interconnecting path 86 will be formed partially from a metallic conductor and partially by a diffused area formed in the semiconductor substrate. This will be discussed in more detail later.

Figure 5:
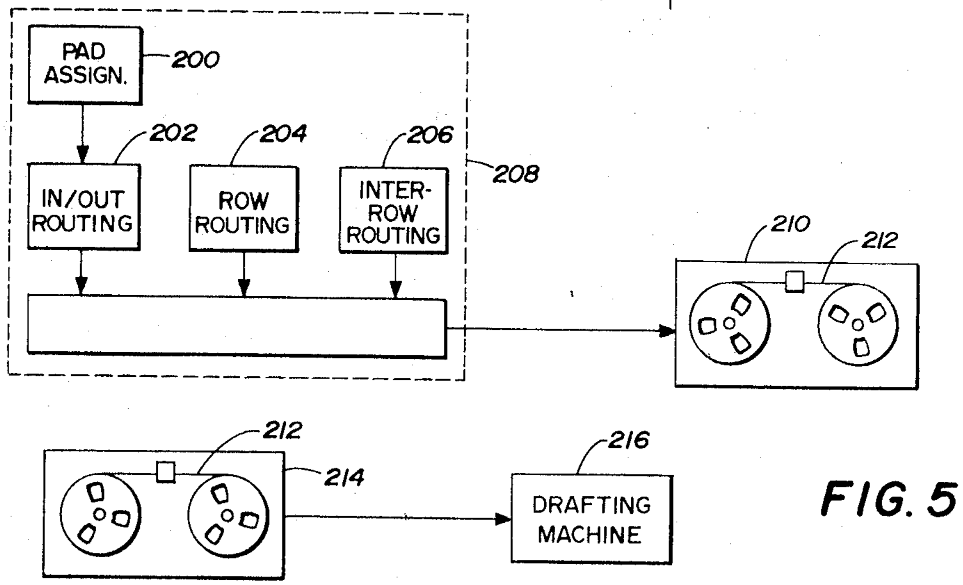
FIG. 5 is a block diagram of a system for utilizing various routines to generate a set of mask patterns.

With completion 313 of the interconnecting of input/output component signal points to assigned pads, all the representations required for generating patterns of an integrated circuit will have been completed. Referring to FIG. 5, there is shown a block diagram of a system for generating a set of pattern masks for fabrication of an integrated circuit. Each of the blocks 200, 202, 204 and 206 represent memory storage for retention of the representations generated. These memory storage areas are part of a computer 208, for example, a UNIVAC 1108. Using the representations stored in the memories, information is transferred from the computer 208 to a tape deck 210 for writing a magnetic tape 212 containing commands for generating a set of pattern masks.

To generate a set of pattern masks with the tape 212, the tape is read by a playback device 214 having an output connected to a drafting machine 216, for example, a CALCOMP Plotter. Commands on the tape 212 guide a cutter over a sheet of peal-coat material. The cutter outlines various circuit interconnections and component details. The tape 212 will be written in sections, each section containing information for one of the masks required to fabricate a given integrated circuit.

Figure 6:
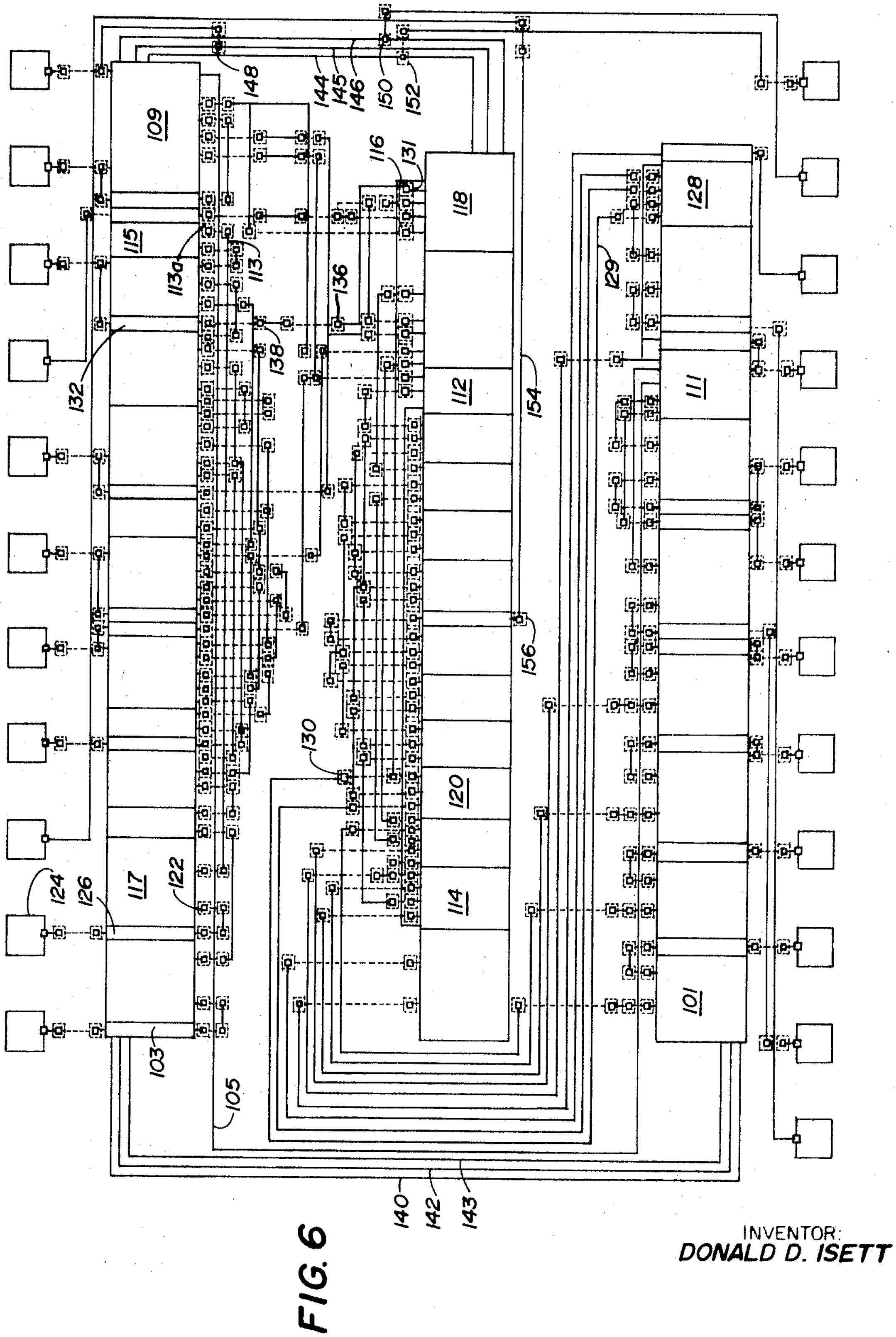
FIG. 6 is a complete layout of the active components and interconnecting paths for a metal-oxide-semiconductor integrated circuit.

Referring to FIG. 6, there is shown a circuit layout of an array interconnected by the routines described above. Initially, active components (represented by blocks in the FIG.) are positioned in rows. Positioning of the component blocks is on the basis of producing the shortest interconnections between signal points on the various rows. Although the example of FIG. 6 shows a three-row array, representations of the interconnections will be generated from a two-row model. Thus, when generating the interconnecting paths, the third row illustrated in FIG. 6 would be aligned with the first row with block 101 of the third row adjacent to block 103 of the first row. After the intrarow connections and interrow connections have been made, a linear transformation is performed to position the three rows as illustrated. In the linear transformation, the interconnecting paths are extended and bent as necessary. This produces the group of parallel lines to the left of the component rows. Not all circuit arrays will require three rows of components. For some circuits, only two rows will be required and in others, as many as four may be necessary. The routine for positioning component blocks determines the number of rows required on the basis of producing an overall array in the form of a square.

Assuming now that the component blocks have been located and that the third row is aligned with row one, the first routine described above with reference to FIG. 1 will establish the intrarow connections. For the purpose of establishing these connections, rows one and three will be considered as one continuous row. Thus, the examples described previously in FIG. 1–4 will be considered by a data processing machine. As explained, the longest interconnection will be considered first. For the first row (i.e., the composite of rows one and three) an interconnection 105 will be made between the component block 109 and the component block 111, this being the longest interconnection in the first available channel. Next, the routine will consider all remaining connections to fit as many as possible in the first available channel. After filling the first channel, an interconnection will be made to establish the line 113 between the blocks 115 and 117. Note, that where the interconnection between the blocks 115 and 117 crosses the interconnection between blocks 109 and 111, the path will be a diffusion conductor (illustrated in dotted outline). Assuming that the circuit array will be fabricated into a semiconductor substrate using impurity diffusion, the dotted portions of the path 113 may be formed as diffusion conductors in the substrate. In an integrated circuit configuration, the path between the component blocks 115 and 117 will start as a metal conductor, change from a metal conductor to a diffusion conductor at a transfer point 113*a* (square areas are transfer points), tunnel under the previously established connection and return to a metal conductor by means of another transfer point. The interconnection 113 will continue in metal until in the area of the block 117. Here it again changes to a diffusion conductor for tunneling under the interconnection path 105.

After all the signal points in the first layout row have been interconnected, signal points in the second row will be similarly interconnected. In this case, the first interconnection to be made in the first stacking channel will interconnect a signal point of the component block 112 to a signal point of the component block 114. Next, an interconnecting path 116 will be established in the second stacking channel from the component block 118 to the component block 120. Again, all the signal points on row two are considered for establishing an interconnection starting with the longest and proceeding to the shortest. For each pass, each interconnection will be considered to determine if there is space available in the channel under consideration for completing the interconnection. Note, that channels six and seven of the second row have five interconnections each.

For the simplified examples of FIGS. 3 and 4, it was assumed that all the input/output signal points were located along the outside edge of the component array. In an actual circuit, however, such may not always be the case. The pad assignment routine, however, considers only points located along the other edge of the component array. Thus, to interconnect an input/output signal point located on the inside edge of a component block, a special connection must be made to bring the point to the array edge. This is accomplished by using feedthrough blocks with are merely conductors for establishing connections from the outside edge of the array to the channel areas. For example, consider the input/output signal point 122 in the component block 117. This point is interconnected to the input/output pad 124. To bring the point 122 out to the outer edge of the circuit array, a feedthrough block 126 is positioned adjacent the block 117. The interconnection between point 122 and the block 126 is then considered a connection between points in the same row and established during the first routine. These are very short interconnecting paths and considered last during each pass. In the second pass for establishing interconnections in the first row, a representation of the path between the signal point 122 and the block 126 was generated. Although this interconnection was considerably shorter than many remaining interconnections, it was placed in the second channel on a space-available basis.

Next, the interconnections between points on the first row (a composite of illustrated rows one and three) and row two will be established. One of the first interconnections that will be completed is between the component block 118 and the component block 128. Note, that this interconnecting path 129 starts from the block 128 and tunnels under two channels using a diffusion conductor and then changes to a metal conductor until aligned with the signal point of the block 118. It then changes at the point 130 to a diffusion conductor to tunnel under previously established metal conductors. Each of the unmade interconnections between the first and second rows will be considered during each pass of the routine for interrow connections commencing from the longest path and proceeding to the shortest path. This continues until all of the interconnections have been completed.

In establishing some of the interconnections, a particular path may change from a metal conductor to a diffusion conductor a number of times. For example, consider the interconnecting path from the signal point 131 of a component block 118 to the feedthrough block 132. Starting from the block 118, the path 131 tunnels under previously established metal conductors as a diffusion conductor. It then changes to a metal conductor to a transfer point 136. Here it changes to diffusion conductor to tunnel under four parallel metal conductors. Again, a change is made to a metal conductor until it reaches the transfer point 138. At the transfer point 138 a connection is made to a diffusion conductor which carries the path to the feedthrough block 132.

In determining whether to remain in diffusion or to return to metal where possible, the automatic data processor considers the condition that would result in the least capacitance to ground. A vertical path will be established as a metal conductor if, one, it crosses no horizontal metal and, two, the total capacitance of the transfer points and metal does not exceed the capacitance of a path remaining in diffusion. The critical value depends on factors including the conductor dimensions and the ratio of diffused capacitance to metal capacitance.

Upon completion of all the interrow connections, the linear transformation takes place to position the third row components as illustrated in FIG. 6. After the linear transformation, representations of power bussing lines 140, 142 and 143, to the left of the rows, will be generated and stored. Further, power bussing lines 144, 145 and 146 to the right of the component rows are also established. Input/output signal points 148, 150 and 152 are defined for connecting the bussing lines to input/output pads.

The next routine to be performed on the circuit of FIG. 6 will be the assignment of input/output signal points to input/output pads. As explained previously, the assignment of signal points to pads is on the basis of a threshold angle. All the input/output signal points are located on the periphery of the component array. This is accomplished by using the feedthrough blocks, as explained, or extending conductors to the array periphery. For example, the conductor 154 extends the point 156 to the array periphery.

Upon completion of the pad assignment, interconnecting paths between the input/output signal points and the assigned pad are generated. These interconnections are made on a numbered ordered basis starting with the first channel and filling each channel with as many interconnecting paths as possible in one pass. Subsequent passes complete interconnections, again on a numbered order, starting with the lowest numbered unassigned input/output signal point.

With the completion of interconnections between the input/output signal points and the input/output pads, all the representations necessary for laying out the circuit of FIG. 6 will have been generated and stored.

Figure 7:
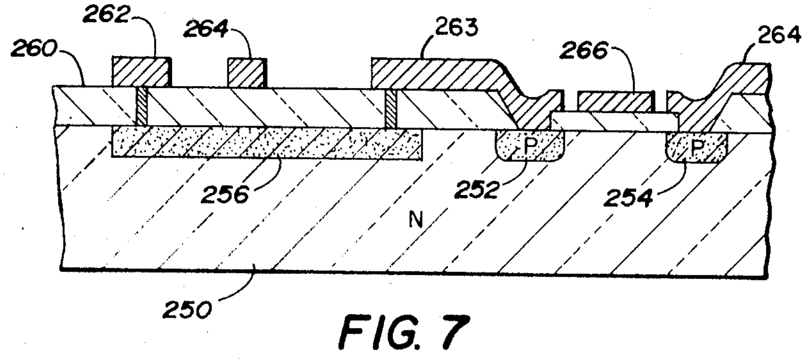
FIG. 7 is a perspective view, partially cut away, of a metal-oxide-semiconductor integrated circuit fabricated from masks generated by the routines of the present invention.

Referring to FIG. 7, there is shown a portion of an integrated circuit in section. Both conductors and active components are shown formed in the substrate 250. For example, the source 252 and drain 254 of a field-effect transistor, along with conductor 256, are formed through an insulating layer 260 (e.g., silicon dioxide) in semiconductor substrate 250, which may be, for example, silicon. Overlaying the insulating layer 260, metal conductors 262, 263, 264 and 265 and the gate electrode 266 of the field-effect transistor will be formed. To fabricate the various conductors and active components, the masks generated on the drafting machine 216 are successively employed.

It should be understood that many active components will be formed simultaneously. The processes used to fabricate a circuit of the type illustrated in FIG. 7 include standard photographic and etching processes along with diffusions of impurities into a substrate. The various insulating layers and metal areas are formed using the set of masks generated by the present invention.

Having described the invention in terms of preferred embodiments, we claim:

1. The method of establishing interconnecting paths in a plurality of numbered conductor channels by an automated data processing machine between numbered input/output component signal points of a circuit array and assigned bonding pads arrayed and spaced from the periphery of said array which comprises:

a. generating and storing in a first pass representations of interconnecting paths between the numbered signal points not previously considered and an assigned bonding pad in the lowest numbered channel on a space-available basis if the interconnecting path provides space for establishing interconnections to all other signal points, b. generating and storing in a subsequent pass in the next highest numbered channel from the previous pass representations of interconnecting paths between the numbered signal points not previously considered in the immediate pass and the assigned bonding pad on a space-available basis if the interconnecting path provides space for establishing interconnections to all other signal points, and c. repeating step (*b*) for the next highest numbered channel for each subsequent repetition until representations of interconnecting paths for all the input/output component signal points and the assigned input/output bonding pads have been generated and stored.

2. The method of establishing interconnecting paths as set forth in claim 1 including the step of generating and storing in a numbered order the *x* and *y* coordinates of each of the input/output component signal points relative to a coordinate center for the circuit array.

3. The method of establishing interconnecting paths as set forth in claim 2 including the step of generating and storing in a number order *x* and *y* coordinates of the bonding pads relative to the same coordinate axis as the signal points.

4. The method of establishing interconnecting paths as set forth in claim 1 wherein the generated and stored representations of interconnecting paths include vertical and horizontal straight-line sections.

5. The method of establishing interconnecting paths as set forth in claim 4 wherein the generated and stored representations of the interconnecting paths include coordinates of the end points and bend points of the vertical and horizontal line sections.

6. The method of establishing interconnecting paths as set forth in claim 1 wherein the representations are generated and stored in an order considering the lowest numbered signal point and proceeding to the highest in each pass.

7. The method of producing a pattern of interconnecting paths in a plurality of numbered conductor channels by an automated data processing machine between input/output component signal points of a circuit array and assigned bonding pads arranged and spaced from the periphery of said array, which comprises:

a. generating and storing in a first pass representations of interconnecting paths between the numbered signal points not previously considered and an assigned bonding pad in the lowest numbered channel on a space-available basis if the interconnecting path provides space for establishing interconnections to all other points, b. generating and storing in a subsequent pass in the next highest numbered channel from the previous pass representations of interconnecting paths between the numbered signal points not previously considered in the present pass and the assigned bonding pad on a space-available basis if the interconnecting path provides space for establishing interconnections to all other signal points, c. repeating step (*b*) using the next highest numbered channel for each repetition until representations of interconnecting paths for all the input/output component signal points and the assigned input/output bonding pads have been generated and stored, and d. generating circuit patterns from the representations of the interconnecting paths.

8. The method of producing a pattern of interconnecting paths as set forth in claim 7 wherein the generated and stored representations of interconnecting paths include vertical and horizontal straight-line sections.

9. The method of producing a pattern of interconnecting paths as set forth in claim 8 wherein the generated and stored representations of the interconnecting paths include coordinates of the end points and bend points of the vertical and horizontal line sections.

10. The method of producing a pattern of interconnecting paths as set forth in claim 7 wherein the representations are generated and stored in an order considering the lowest numbered signal point and proceeding to the highest in each pass.

11. The method of producing a pattern of interconnecting paths as set forth in claim 7 including the step of generating and storing in a numbered order the input/output component signal points and bonding pads assigned to each.

12. The method of producing a pattern of interconnecting paths as set forth in claim 11 wherein a first portion of said pattern defines metal conductors on an insulating layer over a semiconductor substrate and a second portion of said pattern defines conductive paths formed in the semiconductor substrate and connected to the metal conductors.

13. The method of producing a pattern of interconnecting paths as set forth in claim 11 wherein the step of generating and storing an ordered number of the input/output component points and bonding pads assigned to each includes:

a. generating and storing in a numbered order the $x$ and $y$ coordinates of each signal point and each assigned pad relative to a coordinate center of the circuit array, and b. generating and storing a polar angle for each of the signal points and the bonding pads relative to a polar coordinate center.

* * * * *